United States Patent [19]
Zall

[11] 3,876,451
[45] Apr. 8, 1975

[54] ACTIVATED CARBON AND THE METHOD OF MAKING IT
[76] Inventor: David M. Zall, 10 N. Southwood Ave., Annapolis, Md. 21401
[22] Filed: Aug. 24, 1971
[21] Appl. No.: 174,544

[52] U.S. Cl................ 117/62; 117/121; 117/169 R; 117/DIG. 11; 210/39; 210/40; 252/422; 252/425
[51] Int. Cl............................................. B44d 1/44
[58] Field of Search..... 117/100 B, 169 R, DIG. 11, 117/62, 47 R; 210/39, 40; 252/422, 425; 23/209 R, 209.9; 423/460

[56] References Cited
UNITED STATES PATENTS

| 2,029,962 | 2/1936 | Urbain et al..................... 210/40 X |
| 2,292,199 | 8/1942 | Carter............................ 117/100 X |
| 2,685,541 | 8/1954 | Woodburn, Jr. et al........ 117/169 R |
| 2,739,912 | 3/1956 | Smisko................................. 117/228 |
| 3,006,783 | 10/1961 | Haaijman et al................ 117/169 X |
| 3,387,941 | 6/1968 | Murphy............................. 23/209.9 |
| 3,627,570 | 12/1971 | Cass............................ 117/DIG. 11 |

Primary Examiner—William D. Martin
Assistant Examiner—Dennis C. Konopacki
Attorney, Agent, or Firm—R. S. Sciascia; Q. E. Hodges

[57] ABSTRACT

An activated carbon for the removal of phosphate from waste effluents and the process of producing it is disclosed. The activation of the carbon is accomplished by the introduction of cations, such as aluminum, manganese, zinc, iron, lithium or calcium, into the carbon structure which have the ability to react with the phosphates in the waste effluents and thereby fix the phosphates in the carbon material.

3 Claims, No Drawings

ACTIVATED CARBON AND THE METHOD OF MAKING IT

BACKGROUND OF THE INVENTION

Activated carbon is well known as a filtration medium in the treatment of sewage for clarification and removal of undesirable solids that may pollute drinking water. These activated carbons remove solids but do not remove the phosphates which are detrimental to the ecology.

To solve this problem a chemical process has been found that can activate carbon to remove phosphates from the effluent.

SUMMARY OF THE INVENTION

The invention is a chemical process for activating carbon and for removal of phosphates by introducing cations from at least one of the following metals: aluminum, manganese, magnesium, zinc, iron, lithium, or calcium, into the carbon; said cations having the ability to combine with the phosphate to form an insoluble phosphate that can be retained by the carbon.

OBJECTS OF THE INVENTION

It is a principle object of the invention to provide an activated carbon which will remove phosphates from waste effluents to prevent the pollution of harbors and rivers.

A further object of the invention is the production of a new product comprising a prepared carbon having its structure intimately impregnated with cations that have a tendency to combine with phosphates to form insoluble phosphates that will be retained by the carbon.

It is still another object of the present invention to provide a filtering medium which is inexpensive and easy to prepare.

DESCRIPTION OF THE PREFERRED EMBODIMENT

Removal of phosphates from waste effluents is a major objective in water purification. Activated carbon has been used in the past to filter solids but the activated carbon has not been capable of removing phosphates from the effluent. To remedy this situation a method has been found for activating carbon for that particular purpose. The treatment consists of saturating the carbon with a solution of either aluminum chloride, zinc chloride, magnanese chloride, magnesium chloride, calcium chloride, or iron chloride. Chloride solutions are used to obviate the introduction of any undesirable chemicals into the effluent. It would be within the scope of the invention, however, to use nitrates or sulfates as impregnates for activating the carbon. Later in the process however, the carbon is treated with sodium hydroxide. If a nitrate is used some anions may remain in the carbon and upon subsequent use the nitrate may be dissolved out and get into the water. It is not desirable to have nitrates in the effluent for the same reasons that we wish to remove phosphates because they contaminate the water and cause the growth of algae. Therefore, chloride salts are more practical. It is also important that the carbon to be treated is initially dry for optimum absorption. Activated carbon can be impregnated by simply dropping it into a solution containing the metallic chloride and by decanting the solution leaving the carbon wet and saturated. In practice, maximum saturation is obtained by exposing the carbon to a dilute solution, mixing it and adding increased concentrations of the metallic chloride until the carbon is free flowing and has been saturated with the solution. The carbon has been saturated so that it is still free flowing and dry to all appearances is then dried at 105°–125°C between one and two hours. The carbon is then removed from the oven and allowed to air cool. The carbon is then treated with a solution, 5–30% concentration, of sodium hydroxide. It is advantageous to determine in advance the amount of aluminum, zinc, magnanese, magnesium, calcium or iron that has been added by the previous treatment so that the treatment with the sodium hydroxide will be stoichiometric. Optimum results are obtained when an excess of sodium hydroxide is used to make the final product slightly alkaline. Sodium hydroxide reacts with any one of the above mentioned metallic solutions and converts those elements to either oxide salt, oxide or hydroxide. Finally, the treated carbon is washed in distilled water or tap water and dried at 105°–125°C between one and two hours. The activated carbon is now ready for use.

Of the various chlorides, iron chloride would take priority as a practical choice. Iron salts are reasonable in cost and have the additional benefit that if any iron does get into the water it will not be detrimental to the health. It is also noted that instead of sodium hydroxide, potassium hydroxide or any alkali hydroxide could be used. Sodium hydroxide is preferred due to cost. The activated carbon will remove the phosphate because the phosphate in the effluent will combine with the cations that have been introduced into the carbon, i.e., the aluminum, manganese, magnesium, zinc, calcium, iron cations. The cations will combine with the phosphates to form an insoluble compound that will be retained by the carbon.

The previous chemical process requires two major steps. There is another way of impregnating the carbon for removal of phosphates which requires only one step. This particular chemical process is accomplished by using lithium hydroxide directly on the carbon. The carbon is continuously stirred in a dilute solution of lithium hydroxide while small increments of lithium hydroxide are added. After saturation with the lithium hydroxide the carbon is free flowing and dry in appearance. The carbon is then dried at 105°C for about an hour and air cooled. When the phosphate comes in contact with the lithium cations it is converted to lithium phosphate which is insoluble and will be retained by the carbon. It would also be possible to use an alkali earth metal hyroxide, specifically, calcium or barium hydroxide for direct impregnation. Sodium and potassium hydroxide are not useable due to the extreme solubility of their phosphates.

It is understood that the invention is not limited to the exact details described for obvious modifications will occur to persons skilled in the art. It is therefore to be understood that within the scope of the appended claims the invention may be practiced otherwise than as described.

What is claimed is:

1. A process for treating carbon to enable it to remove phosphates from waste effluents, which comprises the steps of:

first, saturating the carbon with a metallic chloride solution selected from the group consisting of aluminum chloride, zinc chloride, manganese chloride, magnesium chloride, calcium chloride, and iron chloride;

drying said saturated carbon to fix the chloride on the carbon structure;

treating the carbon with a solution of alkali hydroxide to form a metal hydroxide deposit which will react with phosphates in the waste effluents for form a water insoluble phosphate.

2. The process as in claim 1 wherein said alkali hydroxide is sodium hydroxide.

3. An activated carbon for removing phosphates from waste effluents comprising:

a carbon structure;

a deposit within said carbon structure of a metallic cation producing compound selected from the group consisting of oxy-salts or oxides or hydroxides of aluminum, manganese, magnesium, zinc, iron, calcium and lithium whereby the soluble phosphates will combine with the cations deposited on the carbon to form a water insoluble phosphate retained on the carbon, when the activated carbon is used.

* * * * *